Nov. 10, 1959 A. K. FERRIS ET AL 2,912,206
AUTOMOBILE WASTE BASKET AND SUPPORT
Filed Aug. 3, 1956
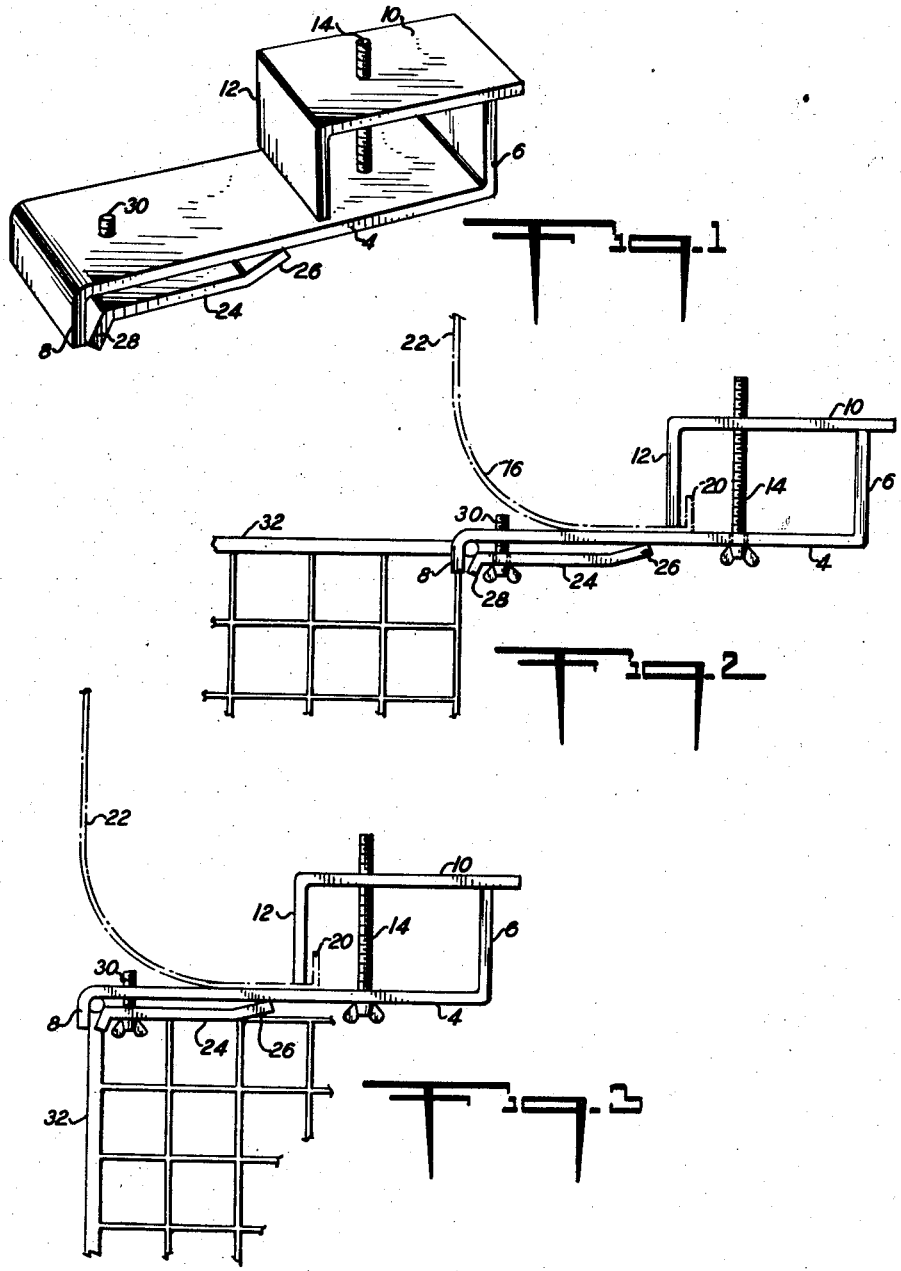
INVENTORS
ANDREW K. FERRIS
DONALD MILLER
BY
ATTORNEYS

United States Patent Office 2,912,206
Patented Nov. 10, 1959

2,912,206

AUTOMOBILE WASTE BASKET AND SUPPORT

Andrew K. Ferris and Donald S. Miller, Chino, Calif.

Application August 3, 1956, Serial No. 602,004

1 Claim. (Cl. 248—229)

The present invention relates to a waste basket and more particularly to a basket especially adapted for use in connection with a motor vehicle.

One of the objects of the present invention is to provide a novelly constructed waste basket especially adapted for motor vehicles, which is retractable so that it may normally be secured in an out of the way position and when so desired, in a novel manner, be brought into its accessible and waste or litter receiving position.

Another important object of the invention is to provide a novelly constructed basket bracket which permits the waste basket to be retractably secured to the dash of a motor vehicle.

The invention broadly contemplates the combination of a waste or litter basket and a novelly constructed bracket adapted to be secured to the dash of a motor vehicle providing for the retraction of the basket to an out of the way position when the basket is not in use.

In the accompanying drawing forming a part of this specification and in which like reference numerals designate corresponding parts:

Fig. 1 is a perspective view of the attaching bracket;

Fig. 2 is a side elevational view showing the bracket secured to the dash of a motor vehicle with the basket in its outer waste receiving position; and Fig. 3 is a similar view showing the waste or litter basket in its retractable position under the dash.

As clearly shown in Fig. 1, the bracket comprises an L-shaped support 4 having an upturned leg portion 6 and a shorter downwardly directed leg portion 8. A somewhat shorter L-shaped member 10 having a leg 12 of substantially the same length as the leg 6 is adjustably secured to the support 4 by the screw bolt 14. As clearly shown in Figs. 2 and 3 the free inner lower end 16 of the dash of a motor vehicle is received between the leg 12 of the L-shaped member 10 and the support 4 and is firmly and removably secured therebetween by the screw bolt 14. In the usual construction of motor vehicle dashes the inner free end is upturned as at 20 so that when the lower portion of the dash 16 is secured between the support 4 and the leg 12 the bracket cannot slide rearwardly and as a result it is held in a firm position with the leg 8 of the bracket adjacent the outer front portion 22 of the dash.

A plate 24 having a slightly upturned rear end portion 26 and a downwardly directed forward portion 28 is adjustably secured to the lower side of the support 4 by means of the screw bolt 30. It will be observed that the holes in the support 4 and the leg 10 are tapped to adjustably receive the screw bolts 14 and 30.

The inner top bead of the wire basket 32 as clearly shown in Figs. 2 and 3, is securely held between the depending leg 8 and leg 28 of the plate 24. The free end of the upturned end 26 of the plate abuts the lower portion of the support 4 holding the plate in spaced relation thereto when the bead is between the plate and the support, the end acting as a point of fulcrum permitting by means of the adjusting bolt 30 the firm securing of the basket 32 in its outer usable position. The waste or litter basket in the usual manner is adapted to receive a disposable paper container or the like and can be pushed to a retracted position beneath the dash as shown in Fig. 3 when not in use. Usually there is provided a pair of these brackets for supporting the basket. While the basket is shown to be of wire construction, any type of basket may be used so long as it is provided with a beaded structure to be received in the bracket as shown.

In view of the above description, it will be seen that the several objects of the invention are achieved and other advantageous results attained.

As many changes could be made in the above constructions without departing from the scope of the invention, it is intended that all matter contained in the above description or shown in the accompanying drawing shall be interpreted as illustrative and not in a limiting sense.

We claim:

A combination receptacle and bracket for attachment to the flange on the lower edge of an instrument panel, said bracket comprising an elongated bar having an upturned end, an L-shaped clamp member having one leg engaging said upturned end and the other leg being parallel to said upturned end and normal to said bar, screw threaded means for moving said other leg towards said bar to engage said flange and secure said bar thereto, the opposite end of said bar being downturned, a gripping member having a downwardly and outwardly extending projection in spaced relation to said opposite end, an upwardly extending portion on said gripping member removed from said projection and engaging said bar and a clamp screw for moving said gripping member towards said bar, said receptacle having a bead at the upper edge received between said downturned end and said projection whereby said receptacle may be frictionally retained in operative extended position or in retracted inoperative position.

References Cited in the file of this patent

UNITED STATES PATENTS

| | | |
|---|---|---|
| 1,389,908 | Shults | Sept. 6, 1921 |
| 1,530,821 | Fagan | Mar. 24, 1925 |
| 2,662,715 | McKnight | Dec. 15, 1953 |
| 2,749,430 | Cohn | June 5, 1956 |
| 2,768,022 | Pope | Oct. 23, 1956 |
| 2,774,480 | Buerger | Dec. 18, 1956 |